E. LURKER.
CUTTING TOOL FOR LATHES, PLANERS, SHAPERS, AND THE LIKE.
APPLICATION FILED NOV. 24, 1917.
1,273,249.
Patented July 23, 1918.
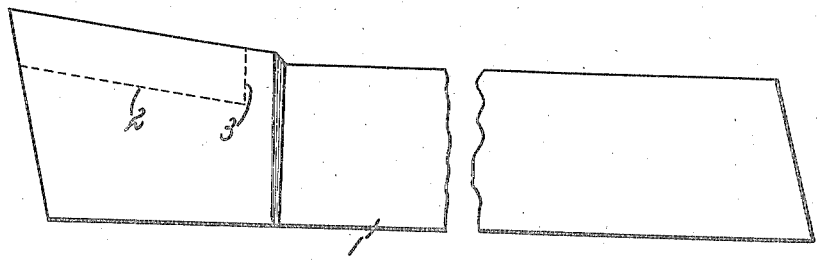
Fig. I.
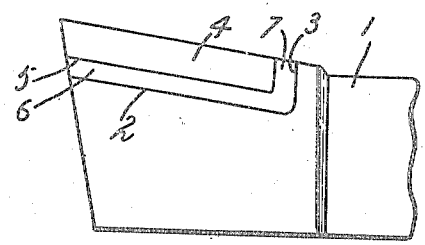
Fig. II.
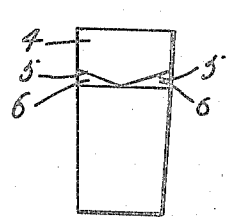
Fig. III.
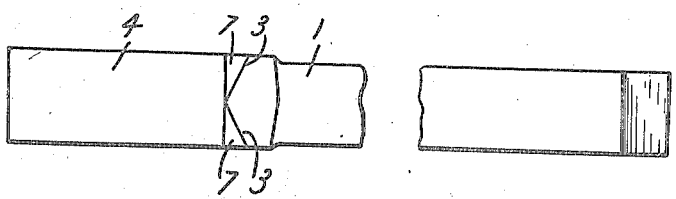
Fig. IV.
Witness
Luther Blake
M. Louise Thurston
Inventor
Edward Lurker
By Chappell & Earl
Attorney

UNITED STATES PATENT OFFICE.

EDWARD LURKER, OF KOKOMO, INDIANA, ASSIGNOR TO HAYNES STELLITE CO., OF KOKOMO, INDIANA.

CUTTING-TOOL FOR LATHES, PLANERS, SHAPERS, AND THE LIKE.

1,273,249.                     Specification of Letters Patent.     Patented July 23, 1918.

Application filed November 24, 1917.   Serial No. 203,762.

*To all whom it may concern:*

Be it known that I, EDWARD LURKER, a citizen of the United States, residing at Kokomo, county of Howard, State of Indiana, have invented certain new and useful Improvements in Cutting-Tools for Lathes, Planers, Shapers, and the like, of which the following is a specification.

This invention relates to improvements in cutting tools for lathes, planers, shapers and the like.

The main objects of the invention are:

First, to provide a tool for lathes, planers, shapers and the like of superior capacity in that it can be operated at higher speed and requires less frequent sharpening than tools now commonly used, thus increasing the capacity of the machine.

Second, to provide a cutting tool in which the shank is formed of carbon steel and the blade or bit from an alloy having the characteristics and advantages above indicated and secured to the shank by a welding insert of the same alloy.

Third, to provide a bit or blade for cutting tools of a design which expedites the securing of it to the shank of the tool.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side elevation of a tool embodying the features of my invention, portions of the shank being broken away.

Fig. II is a detail side elevation of the shank and the bit arranged thereon prior to welding.

Fig. III is a front elevation prior to the welding.

Fig. IV is a detail plan view prior to welding.

In the drawing similar reference characters refer to similar parts throughout the several views.

In the manufacture of my improved tool I preferably form the shank of 40% to 50% carbon steel, drop forged and heat treated. The bit or blade is an alloy of cobalt and metals of the chromium group, known commercially as "stellite." Such alloys are described in the patents to Edward Haynes, #873,745, December 17, 1907; #1,057,423; #1,057,828, April 1, 1913; and #1,150,113, August 17, 1915.

In this specification and claims I, for the sake of brevity, use the trade name "stellite" and contemplate thereby the cobalt-chromium alloys, described in the above patents, and the equivalents thereof.

The blades of these alloys, among other valuable chacteristics, possess the property of being capable of cutting various metals at a high rate of speed and require less frequent sharpening than any so-called "high-speed" steel known to the applicant.

My improved tool, as illustrated, comprises the shank 1 having a bit seat 2 formed therein, the inner wall of the seat being chamfered toward each side, as at 3. The angle of the chamfer is preferably about 30°.

The "stellite" blade or bit 4 has its seating face chamfered at an angle of about 30°, so that this face, coacting with the face of the seat, provides outwardly expanding or outwardly facing V-shaped grooves or recesses 6. The inner end of the blade coacting with the chamfered end wall of the seat forms outwardly facing V-shaped recesses 7. The bit is arranged upon its seat, as shown in Figs. II and III, and secured thereto by filling the recesses 6 and 7 with a welding filling of fused "stellite." This is preferably accomplished by connecting the shank of the tool with the negative terminal of an electric current and the positive terminal with an electrode of "stellite," which is brought into contact with the parts to be united and fuses and fills the recesses between them, so that, in effect, an autogenous welded joint is secured. After the welding the tool may be finished as desired.

By using the "stellite" for welding a joint or union for the blade is secured which not only has the advantages of great strength, but the metal forming the weld becomes an integral part of the bit and the tool may be ground to the point where the welding metal is united with the shank. This adds materially to the life of the tool, as it may be used until substantially the whole bit is consumed. The tool is, as before stated, capable of withstanding high speed work and heavy cuts, its use materially increasing the capacity of lathes, planers, and like tools.

Having thus described my invention, what I claim as new and desire to secure by Letters Patent, is:

1. A cutting tool comprising a shank having a bit seat with a flat bottom and a chamfered inner end wall, a bit of "stellite" chamfered toward each side on its seating face and coacting with said bottom and end of said seat to provide outwardly facing V-shaped side and end grooves, and a welding filling of "stellite" for said grooves.

2. A cutting tool comprising a shank having a bit seat with a flat bottom, a bit of "stellite" chamfered toward each side on its seating face and coacting with said seat bottom to provide outwardly facing V-shaped side grooves, and a welding filling of "stellite" for said grooves.

3. A cutting tool comprising a shank having a bit seat with a flat bottom and a chamfered inner end wall, a bit chamfered toward each side on its seating face and coacting with said bottom and end of said seat to provide outwardly facing V-shaped side and end grooves, and a welding filling for said grooves.

4. A cutting tool comprising a shank having a bit seat with a flat bottom, a bit chamfered toward each side on its seating face and coacting with said bottom of said seat to provide outwardly facing V-shaped side grooves, and a welding filling for said grooves.

5. A cutting tool comprising a shank having a bit seat, and a bit of "stellite" chamfered on its seating face toward each side and coacting with said seat to provide outwardly expanding grooves, said grooves being filled with fused "stellite" integrally uniting said bit and shank.

6. A cutting tool comprising a shank of carbon steel, and a "stellite" bit disposed on and secured to said shank by a weld of "stellite".

7. A cutting tool comprising a metal shank having a bit seat, a bit disposed on said seat, and a welding insert between the said bit and shank of the same metal as the bit.

In witness whereof, I have hereunto set my hand and seal in the presence of two witnesses.

EDWARD LURKER. [L. S.]

Witnesses:
  F. C. JACOBS,
  ALLEN SHELDON.